(12) United States Patent
Courcier et al.

(10) Patent No.: US 12,203,625 B2
(45) Date of Patent: Jan. 21, 2025

(54) OPTICAL MODULE OF A MOTOR VEHICLE LIGHTING SYSTEM

(71) Applicant: VALEO VISION, Bobigny (FR)

(72) Inventors: Marine Courcier, Unterfoehring (DE); Eric Moisy, Unterfoehring (DE); Stefan Namyslo, Unterfoehring (DE)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 18/573,309

(22) PCT Filed: Jun. 26, 2022

(86) PCT No.: PCT/EP2022/067465
§ 371 (c)(1),
(2) Date: Dec. 21, 2023

(87) PCT Pub. No.: WO2022/269095
PCT Pub. Date: Dec. 29, 2022

(65) Prior Publication Data
US 2024/0310018 A1    Sep. 19, 2024

(30) Foreign Application Priority Data
Jun. 25, 2021 (FR) .................................... 21 06822

(51) Int. Cl.
*F21S 43/241*    (2018.01)
*F21S 41/143*    (2018.01)
(Continued)

(52) U.S. Cl.
CPC ........... *F21S 43/241* (2018.01); *F21S 41/143* (2018.01); *F21S 41/24* (2018.01); *F21S 41/27* (2018.01);
(Continued)

(58) Field of Classification Search
CPC ........ F21S 43/247; F21S 41/24; F21S 41/143; F21S 41/25
See application file for complete search history.

(56) References Cited

U.S. PATENT DOCUMENTS

| 4,389,698 A | 6/1983 | Cibie |
| 10,955,102 B1 * | 3/2021 | Lee ...................... F21S 41/151 |

(Continued)

FOREIGN PATENT DOCUMENTS

| CN | 111765430 A | 10/2020 |
| EP | 1 298 386 A1 | 4/2003 |

(Continued)

OTHER PUBLICATIONS

International Search Report issued Aug. 4, 2022 in PCT/EP2022/067465, filed on Jun. 26, 2022, 3 pages.

*Primary Examiner* — Eric T Eide
(74) *Attorney, Agent, or Firm* — Oblon, McClelland, Maier & Neustadt, L.L.P.

(57) ABSTRACT

An optical module of a lighting system of a motor vehicle includes a light source, a primary optical system including at least two optical members, each optical member being arranged to form an image from the light source. The image is shifted with respect to the image formed by each other optical member from the light source. An optical projection system is arranged to project onto the ground the image formed by each optical member of the primary optical system from the light source.

16 Claims, 3 Drawing Sheets

Figure 1:
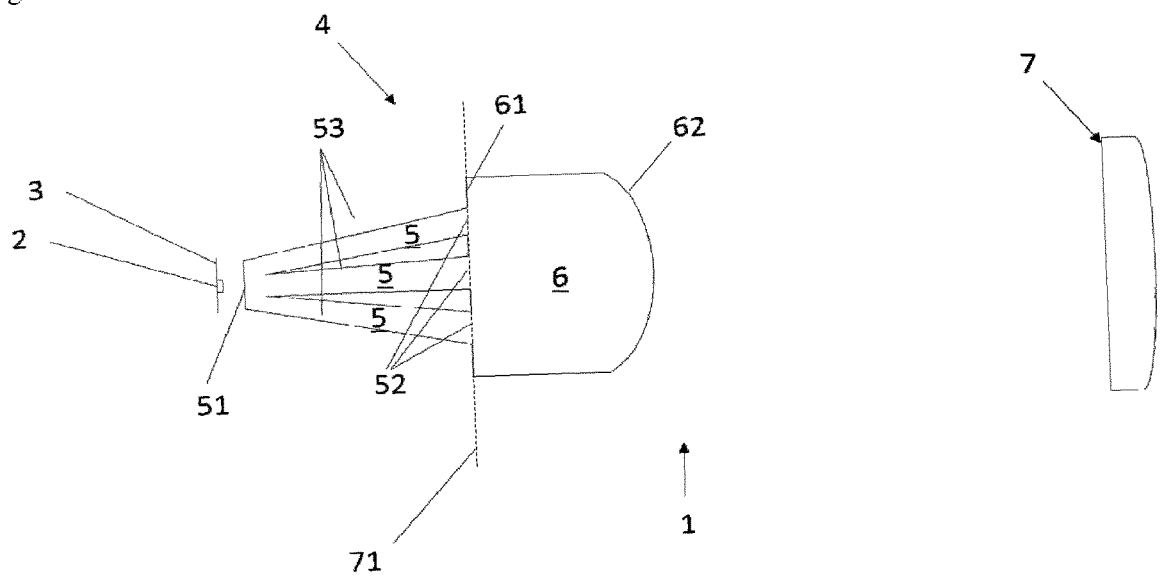

(51) Int. Cl.
  *F21S 41/24* (2018.01)
  *F21S 41/27* (2018.01)
  *F21S 43/14* (2018.01)
  *F21W 103/20* (2018.01)
  *F21W 103/45* (2018.01)

(52) U.S. Cl.
  CPC .......... *F21S 43/14* (2018.01); *F21W 2103/20* (2018.01); *F21W 2103/45* (2018.01)

(56) References Cited

U.S. PATENT DOCUMENTS

| | | | |
|---|---|---|---|
| 2015/0131305 A1* | 5/2015 | Courcier | F21S 41/322 362/516 |
| 2015/0226395 A1* | 8/2015 | Taudt | F21S 41/25 362/511 |
| 2016/0265733 A1 | 9/2016 | Bauer et al. | |
| 2018/0087732 A1* | 3/2018 | De Lamberterie | F21S 41/26 |
| 2019/0234572 A1* | 8/2019 | Courcier | F21S 41/265 |
| 2020/0063938 A1 | 2/2020 | Kurashige et al. | |
| 2021/0041076 A1 | 2/2021 | Kurashige et al. | |

FOREIGN PATENT DOCUMENTS

| | | |
|---|---|---|
| EP | 2 317 214 A1 | 5/2011 |
| EP | 3 543 592 A1 | 9/2019 |
| GB | 2 066 444 A | 7/1981 |
| WO | WO 2020/001999 A1 | 1/2020 |

\* cited by examiner

OPTICAL MODULE OF A MOTOR VEHICLE LIGHTING SYSTEM

The invention relates to the field of luminous automotive vehicle systems. More precisely, the invention relates to an optical module for a luminous system of an automotive vehicle.

In the field of automotive lighting and light-based signaling, it is known to perform, in addition to conventional functions, functions allowing logos or luminous patterns to be projected onto the ground, in the vehicle's near field. This type of function may for example be used in the context of driver assistance, for example to produce a marking on the ground allowing a traffic lane to be indicated. This type of function may also be used to enhance a conventional signaling function, in order to warn another road user of a change of path.

In order to project the luminous pattern or logo onto the ground, one known solution consists in introducing dark regions into a pixelated light beam emitted by a luminous system of the automotive vehicle, the driver or road user thus seeing the pattern or logo through the contrast between the dark and bright regions. However, this solution requires the light beam to have a particularly high resolution and therefore requires a particularly high number of light sources, this making the luminous system expensive and complex.

Another known solution consists in projecting the light emitted by a light source through a mask perforated with an aperture the outline of which corresponds to the outline of the pattern or logo that it is desired to project onto the ground. Although this solution is much less expensive than the preceding one, it is inefficient since a large part of the light is blocked or absorbed by the mask.

Another known solution consists in collecting the light emitted by a plurality of light sources, via light guides, then in projecting images of the exit faces of these light guides onto the ground, via a projecting optical system. Although this solution is satisfactory from the point of view of efficiency and simplicity, it does not however allow complex patterns to be formed on the ground without multiplying the number of light sources and light guides.

There is thus a need for an optical module capable of projecting a luminous pattern or logo onto the ground which allows a complex pattern to be formed using a single light source and which is efficient and simple.

The present invention falls within this context and aims to meet this need.

To these ends, one subject of the invention is an optical module for a luminous system of an automotive vehicle, comprising:
 a. a light source;
 b. a primary optical system comprising at least two optical members, each optical member being arranged to form an image from said light source, said image being offset with respect to the image formed by each other optical member from said light source;
 c. a projecting optical system arranged to project, onto the ground, the image formed by each optical member of the primary optical system from said light source.

In the invention, the light rays emitted by the light source are deflected by the optical members so that each forms a distinct image of the light source. It may be a question of a virtual image or of a real image, which may substantially correspond to a magnification of the image of the emission surface of the light source or rather be a distorted image of this emission surface. It will be noted that most of the light rays emitted by the light source, or even all thereof, can thus be collected by the optical members to form the images. The images may for example be adjacent and have a common boundary, or may be separate. Each image is then projected onto the ground by the projecting optical system, in order to obtain on the ground a complex pattern the outlines of which have a satisfactory sharpness.

Preferably, the projecting optical system has a focal surface passing substantially through the image formed by each optical member of the primary optical system from said light source.

In one example of embodiment of the invention, the projecting optical system is arranged to project the images formed by the optical members of the primary optical system onto the ground, in the vehicle's near field. By near field, what is meant is a projection distance of less than 10 meters and in particular of less than 5 meters and/or an overall projection direction making an angle of at least 5° below the horizontal and in particular of at least 10° below the horizontal. These images may thus contribute to performance of a function indicating a path being followed by the vehicle, in particular a function such as a direction indicator or reversing light.

In the present invention, the luminous pattern formed by projecting the secondary image onto the ground using the projecting optical system may form a logo, a pictogram, a geometric pattern or a set of a plurality of logos, pictograms or geometric patterns or a combination thereof, for example a pictogram associated with one or more geometric patterns.

In one embodiment of the invention, the optical members are linked to the same exit optical member so as to form a primary optical element of the primary optical system, each optical member comprising a light entrance face, opposite which the light source is placed, and a junction face linking said optical member to the exit optical member, the primary optical element being a one-piece part. Where appropriate, the projecting optical system is arranged to project onto the ground an image of each of the junction faces of the optical members. In other words, each optical member is a primary optical member arranged to form an image of the light source at its junction face with the exit optical member.

Preferably, each optical member is arranged so that the image of its junction face projected onto the ground by the projecting optical system is entirely bounded by appreciably sharp edges. In the invention, by "an image projected onto the ground has an appreciably sharp edge" what is meant is that the variation in the illumination on the ground caused by this projection, between two points located on either side of this edge in a direction substantially perpendicular to the edge and separated by at least 1 cm, has a slope, in particular at at least one point, greater than or equal to 10 lux/cm. For example, the projecting optical system may have a focal surface passing substantially through each of the optical members' junction faces with the exit optical member. For example, said focal surface may be a plane or a curved surface located substantially in the junction plane between the junction surfaces and the exit optical member.

For example, the entrance faces of the optical members may be formed by the same entrance face, the latter being common to all the optical members, each optical member extending from this common entrance face toward the exit optical member in a distinct direction to the other optical members.

Advantageously, the optical members may be linked to the exit optical member so that the junction faces, with the exit optical member, of at least two adjacent optical members are spaced apart from each other. According to this feature, it is thus possible to generate a space between the images of the junction faces of these two adjacent optical members, this space being sharply delineated on the ground by the edges of these images. Provision may be made for all the junction faces to have substantially the same shape, orientation and/or dimensions, or as a variant for at least two junction faces to have a distinct shape, orientation and/or dimensions.

Advantageously, each optical member comprises a primary light guide.

In another embodiment of the invention, the primary optical system comprises a primary optical element comprising at least one primary light guide linked to an exit optical member, said primary light guide comprising a light entrance face, opposite which is placed said light source, and a junction face linking said primary light guide to the exit optical member, the primary optical element being a one-piece part, said image formed by each optical member being an image of said junction face. In this embodiment, each optical member is a secondary optical member. It is conceivable for the optical members to together form a secondary optical element that is a one-piece part. Preferably, the primary optical element comprises a single primary light guide, and each optical member thus images the primary-light-guide junction face with the exit optical member.

Advantageously, each optical member may be a lens, and in particular a microlens, having an optical axis distinct from the optical axis of each other lens. Where appropriate, each lens may have an object focal surface passing substantially through the primary light guide's junction face with the exit optical member. If so desired, the optical axes of the lenses may be parallel to one another and offset with respect to one another, vertically for example.

Preferably, the lenses may be arranged so that the images of said junction face are formed in the same plane upstream of the junction face. Where appropriate, the projecting optical system may have a focal surface passing substantially through this plane.

As a variant, each optical member may be a facet of the same reflector, said facet having an inclination distinct from the inclination of each other facet of said reflector.

Advantageously, in either embodiment, the entrance face of the or each primary light guide may be linked to the junction face of said primary light guide by an envelope such that each point of the outline of the entrance face is linked to one point of the outline of the junction face by a straight line. In other words, the envelope of the light guide is a developable surface. According to this characteristic, the light emitted by a light source through the entrance face of a primary light guide propagates by total internal reflection from the walls of the light guide until it reaches the junction face. The fact that the envelope is a developable surface makes it possible to form, at the junction face, a pattern that is entirely delineated by appreciably sharp edges.

Advantageously, the entrance face of said, and in particular of each, primary light guide is substantially rectangular. Where appropriate, the junction face of said light guide has a substantially different shape to that of its entrance face. According to this feature, each primary light guide may be optimized so as to obtain, at its junction face, a pattern of predetermined shape corresponding to the shape of this junction face, which may be distinct from one primary light guide to another, and which may be projected onto the ground in the sharpest manner possible by the projecting optical system. Preferably, said junction face may have a number of edges that is different from that of said entrance face and/or edges with dimensions that are distinct from those of the edges of said entrance face and/or angles between the edges that are distinct from those between the edges of said entrance face. In particular, the shape of said junction face may be distinct from any shape able to be obtained by homothetic transformation of the shape of said entrance face. For example, said junction face may be substantially triangular, trapezoidal, or in the shape of a rhombus or pentagon.

Advantageously, the exit optical member has a smooth, substantially dome-shaped exit face.

Preferably, the respective refractive indices of the primary light guides and of the exit optical member are substantially identical. For example, the primary light guides and the exit optical member are manufactured from the same material, and are in particular made of the same polymer. By "same material", what is meant is that the primary light guides and the exit optical member are made from materials that are at least derived from the same base polymer, for example polycarbonate (or PC) or PMMA. However, these materials may have different fillers. Preferably, the primary light guides and the exit optical member may be produced in a single mold so as to form the primary optical element, this primary optical element thus being a one-piece part. As a variant, one or more, or even all, of the primary light guides and the exit optical member may be produced in distinct molds, then be assembled so as to form the primary optical element. If appropriate, said primary light guides produced in molds that are distinct from that of the exit optical member may be adhesively bonded to the exit optical member by means of an adhesive with a refractive index substantially identical to those of these primary light guides and of the exit optical member.

For example, the projecting optical system has at least one lens and/or at least one reflector and/or a combination of at least one lens and of at least one reflector. Preferably, the projecting optical system may comprise a single projecting lens the focal surface of which passes substantially through the junction surfaces of the primary optical members with the exit optical member. As a variant, the projecting optical system may comprise a substantially planar mirror arranged so as to form virtual images of the junction surfaces on one side of this substantially planar mirror and a projecting lens located on the other side of this substantially planar mirror and the focal surface of which passes substantially through these virtual images. This type of projecting optical system makes it possible to substantially reduce the bulk of the optical module.

Preferably, the light source comprises a light-emitting semiconductor chip, in particular a light-emitting diode.

Another subject of the invention is a luminous system for an automotive vehicle, comprising an optical module according to the invention.

For example, said luminous system may comprise a light-emitting device such as a motor-vehicle taillight and/or motor-vehicle front headlight, and/or a light-emitting device arranged in a bumper of an automotive vehicle and/or in a rear-view mirror of an automotive vehicle, the optical module being arranged in this light-emitting device.

Figure 2:
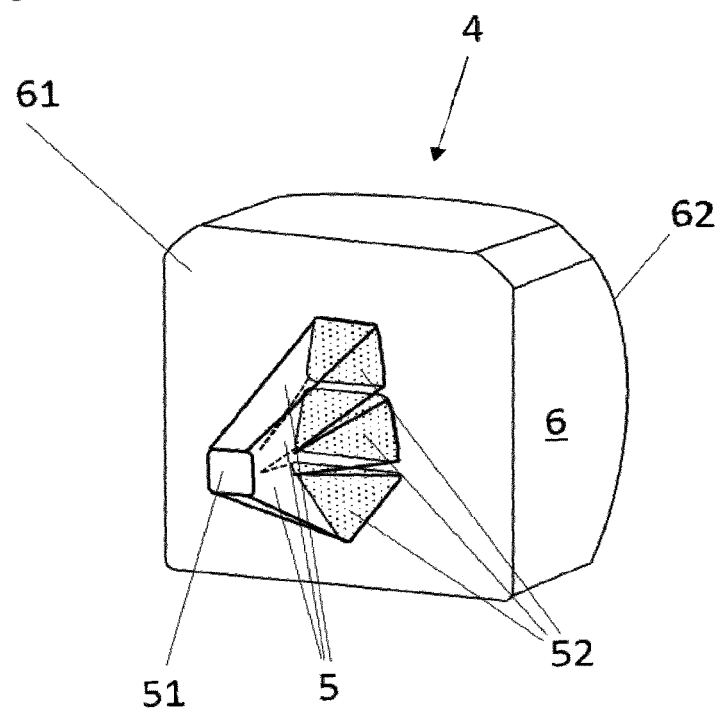
Figure 3:
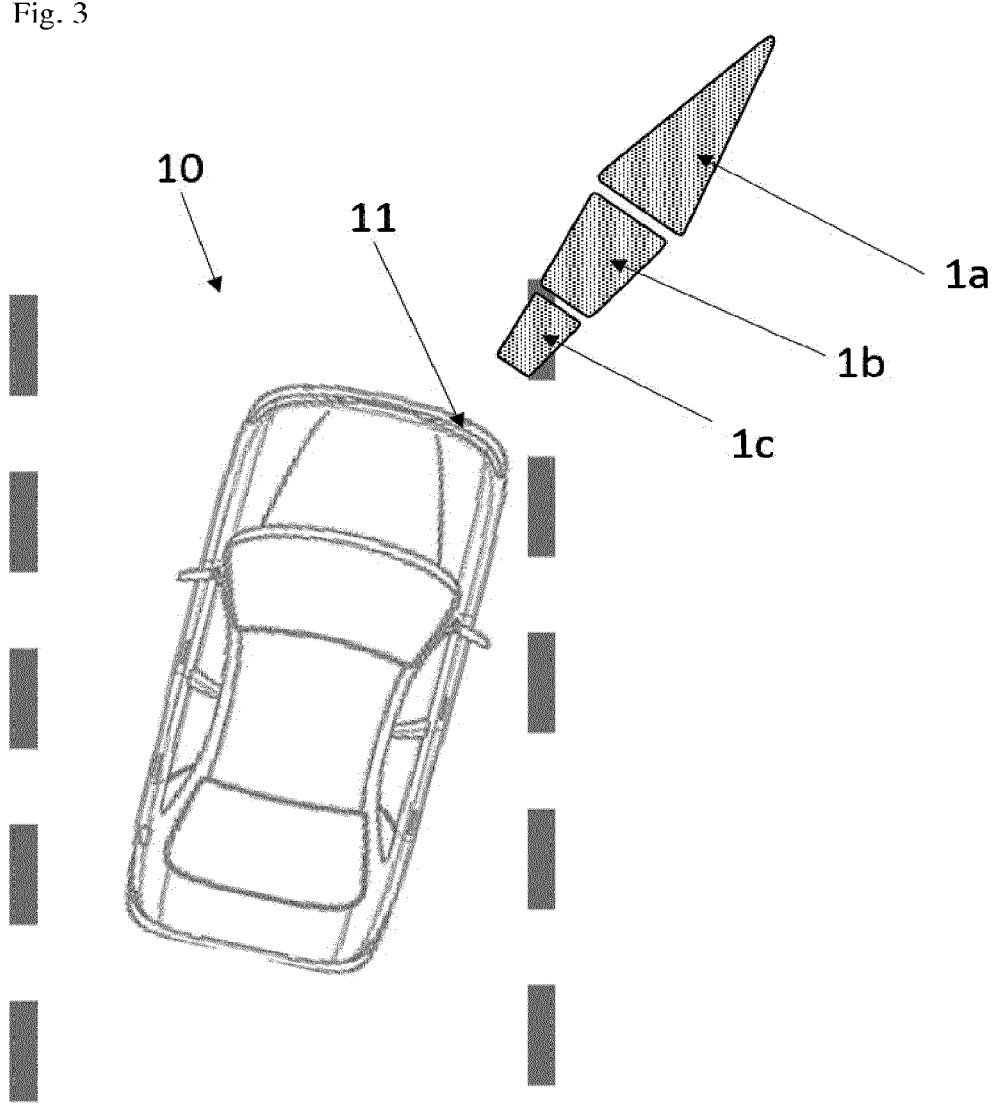
Figure 4:
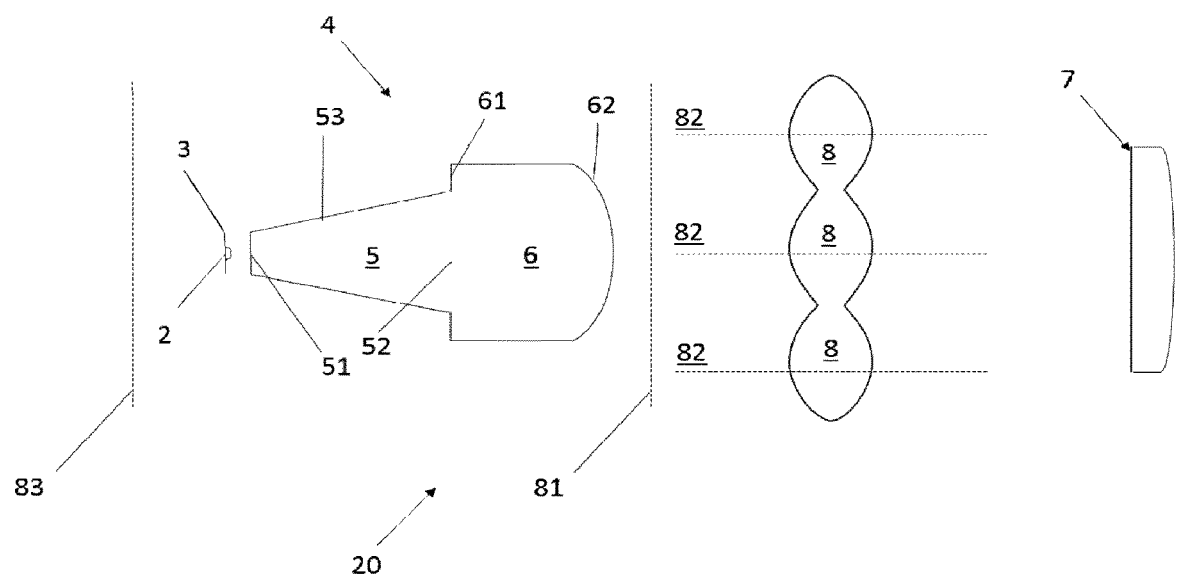

The present invention will now be described by way of examples that merely illustrate and in no way limit the scope of the invention, and with reference to the appended drawings, in which drawings the various figures depict:

FIG. 1 schematically and partially depicts a cross-sectional view of an optical module according to one embodiment of the invention;

FIG. 2 schematically and partially depicts a perspective view of the primary optical element of the module in FIG. 1;

FIG. 3 schematically and partially depicts a luminous system of an automotive vehicle according to one embodiment of the invention and incorporating the optical module in FIG. 1; and FIG. 4 schematically and partially depicts a cross-sectional view of an optical module according to another embodiment of the invention.

In the following description, elements that are identical, in structure or function, and that appear in more than one figure, have been designated by the same reference signs, unless otherwise indicated.

FIG. 1 depicts an optical module 1 for a luminous system of an automotive vehicle according to a first embodiment of the invention.

The optical module 1 comprises a single light-emitting diode 2 mounted on a printed circuit board 3.

The optical module 1 comprises a primary optical system 4, taking the form of a primary optical element 4 arranged downstream of the light-emitting diodes 2. This primary optical element 4 will be described with reference to FIG. 2, which shows a rear perspective view of this element 4.

The primary optical element 4 comprises a plurality of optical members 5 and an exit optical member 6 to which these optical members 5 are linked. In the example described, each optical element is a primary optical member 5 taking the form of a primary light guide.

The primary light guides 5 have a common entrance face 51, opposite which the LED 2 is placed, the light potentially emitted by this LED 2 thus entering each primary light guide 5 via this entrance face 51.

Each primary light guide 5 is linked to the exit optical member 6 by a junction face 52, which is located opposite the entrance face 51 and on an upstream wall 61 of the exit optical member 6. The primary light guides 5 lie one above the next such that the junction faces 52 are spaced apart from one another.

Each primary light guide 5 thus extends from the common entrance face 51 to its junction face 52. The primary light guides 5 therefore have a common envelope until they separate to each extend to their exit face in an envelope 53 of their own. This envelope 53 is a developable surface, such that each point of the outline of the entrance face 51 is linked, via the envelope 53, to one point of the outline of the junction face 52 by a straight line. The light potentially emitted by the LED 2 located facing the entrance face 51 is thus coupled to each primary light guide 5, and propagates via successive total internal reflections against the envelope 53 until it reaches the junction face 52, via which it is decoupled from the primary light guide 5 and enters the exit optical member 6. The junction face 52 thus forms an imaginary exit face of the primary light guide 5.

The junction faces 52 of the primary light guides 5 may be separate from one another and from the entrance face 51. The junction face 52 of a primary light guide 5 thus defines, by virtue of its outline, a pattern the shape of which is predetermined and specific to this light guide 5. The envelope 53 of each primary light guide 5 thus makes it possible to exploit all the light emitted by the LED 2 through the entrance face 51 so as to obtain at the junction face 52 a pattern that is entirely delineated by appreciably sharp edges. Likewise, the envelope 53 makes it possible to obtain a uniform distribution of light inside this pattern, at the junction face 52.

In the described example, the junction face 52 of the lower light guide has a triangular shape, while the junction faces 52 of the central and upper light guides are trapezoidal, the dimensions of the junction face 52 of the upper guide being smaller than those of the junction face 52 of the central guide.

As explained above, the primary light guides 5 are arranged such that two adjacent junction faces 52 are spaced apart. In other words, the primary light guides 5 thus make it possible to form a plurality of images, from the LED 2, at the junction faces 52, these images thus being vertically offset with respect to one another.

The primary optical element 4 is a one-piece part, the primary light guides 5 and the exit optical member 6 being manufactured from the same material, namely polycarbonate or PC. In the described example, the primary optical element 4 is a part produced in a single mold. In other words, the refractive index of the primary light guides 5 and of the exit optical member 6 is identical, and there is no dioptric interface at the junction faces 52, such that the light entering the exit optical member 6 from the primary light guides 5 undergoes no deflection at the junction faces 52.

The exit optical member 6 has a smooth, dome-shaped exit face 62 opposite the upstream face 61. More precisely, this exit face 62 may be partially spherical, the exit optical member 6 thus having a truncated ball shape. The exit face 62 is in particular centered on the junction face 52 of the central light guide 5. As a result, the light coming from the junction faces 52 undergoes substantially no deflection during its exit from the primary optical member 4 via this exit face 62. The exit optical member 6 thus forms a carrier for mounting the primary light guides 5, and it is possible to arrange elements for fastening the primary optical element 4 on this exit optical member 6.

The optical module 1 comprises a projecting optical system 7. In the example in FIG. 1, the projecting optical system 7 is a projecting lens 7 having a focal plane 71 passing substantially through the junction surfaces 52 of the primary light guides 5.

This projecting lens 7 is thus arranged to project onto the ground, in a near field, images of the junction faces 52. Since the patterns formed on the junction faces 52 are entirely delineated by sharp edges, as a result of the primary light guides 5, and the focal plane 71 passes through these junction faces 52, these images projected onto the ground are therefore themselves entirely delineated by sharp edges, corresponding to the edges of these junction faces 52, after inversion by the projecting lens 7.

FIG. 3 illustrates a luminous system 10 of an automotive vehicle according to one example of embodiment of the invention.

The luminous system 10 comprises a front headlight 11 within which the optical module 1 of FIG. 1 is arranged.

The luminous system 10 comprises a control unit (not shown) that receives instructions from a computer of the automotive vehicle with a view to performing light-emitting functions, and that controls the LED 2 of the optical module 1 depending on these instructions.

On receipt of an instruction to emit a sequential direction-indicator function, which is for example generated by the computer when the automotive vehicle wants to change lane, the control unit activates the LED 2, the optical module 1 thus projecting onto the ground, in the vehicle's near field, images 1a, 1b and 1c of the junction faces 52 of the primary light guides 5. It will thus be understood that the optical module 1 thus performs a direction-indicator function that may complement a direction-indicator function performed by a taillight of the vehicle. Since the images 1a, 1b and 1c are projected onto the ground, in the vehicle's near field, they are thus able to be easily perceived by a road user driving on the right of the automotive vehicle. In particular, the images duplicated by each primary light guide 5 from the LED 2 are shown in FIG. 3.

FIG. 4 depicts an optical module 20 of a luminous system of an automotive vehicle according to a second embodiment of the invention.

In this example, the optical module 20 comprises, as in the example of FIG. 1, a single LED 2 and a primary optical element arranged downstream of the light-emitting diodes 2. However, unlike FIG. 1, the primary optical element comprises a single primary light guide 5, the function of which is only to form, at the junction face 52, an image from the LED 2. This primary light guide 5 thus participates in forming the pattern that will be projected onto the ground, but not in duplication of this pattern.

To this end, the primary optical system 4 of the optical module 20 comprises a plurality of optical members 8 arranged between the primary optical element 4 and the projecting optical system 7. Each optical member 8 is thus a secondary optical member, formed in the example of FIG. 4 by a microlens 8.

Each microlens 8 has a focal surface 81 located downstream of the junction face 52, and an optical axis 82, the optical axes 82 being parallel to one another but offset with respect to one another. Each microlens 8 is thus arranged to form an image of the junction face 52 in a given plane 83 located upstream of the primary optical element 4, through which a focal surface of the projecting optical system 7 passes, the images of the junction face 52 being offset vertically with respect to one another.

Projection of these images of the junction face 52, by the projecting optical system 7, thus makes it possible to project onto the ground the same pattern in a duplicated manner.

The above description clearly explains how the invention achieves the objectives that were set for it, namely providing an optical module that is capable of projecting onto the ground a complex pattern from a single light source and that is efficient and simple, this optical module comprising optical members arranged to duplicate an image formed from the light source.

In any event, the invention is not limited to the embodiments specifically described in this document, and extends, in particular, to any equivalent means and to any technically operational combination of these means. It is in particular possible to envision using types of light source other than those described, and in particular light sources that are able to emit light of a color other than white or light of which the color can be controlled. It is also possible to envision shapes for the junction faces other than those described. It is also possible to envision types of optical members other than a light guide or microlens, and in particular collimators, lenses or microlenses, faceted reflectors or combinations of various types of primary optical members. It is also possible to envision light-emitting functions other than those described, and in particular other functions for indicating a change of motor-vehicle path, such as a reversing indicator or a lane-change indicator, driver-assistance functions or indeed inter-vehicle communication functions.

The invention claimed is:

1. An optical module for a luminous system of an automotive vehicle, comprising:
   a light source;
   a primary optical system comprising at least two optical members, each optical member being arranged to form an image from said light source, said image being offset with respect to an image formed by each other optical member from said light source; and
   a projecting optical system arranged to project, onto the ground, the image formed by each optical member of the primary optical system from said light source, wherein
   the at least two optical members are linked to an exit optical member,
   the at least two optical members comprise a shared light entrance face opposite the light source and each optical member comprises a junction face linking the optical member to the exit optical member, and
   the shared light entrance face is linked to the junction face of each optical member by an envelope such that each point on an outline of the shared light entrance face is linked to a point on an outline of each junction face of each optical member by a straight line.

2. The optical module as claimed in claim 1, wherein the projecting optical system has a focal surface passing substantially through the image formed by each optical member of the primary optical system from said light source.

3. The optical module as claimed in claim 1, wherein the optical members are linked to the same exit optical member to form a primary optical element of the primary optical system, the primary optical element being a one-piece part, and wherein the projecting optical system is arranged to project onto the ground an image of each of the junction faces of the optical members.

4. The optical module as claimed in claim 3, wherein each optical member comprises a primary light guide.

5. The optical module as claimed in claim 1, wherein the primary optical system comprises a primary optical element comprising at least one primary light guide linked to the exit optical member, said primary light guide comprising the shared light entrance face, opposite which is placed said light source, and a junction face linking said primary light guide to the exit optical member, the primary optical element being a one-piece part, and wherein said image formed by each optical member is an image of said junction face.

6. The optical module as claimed in claim 5, wherein each optical member is a lens having an optical axis distinct from an optical axis of each other lens.

7. The optical module as claimed in claim 6, wherein the lenses are arranged so that the images of said junction face are formed in the same plane upstream of the junction face.

8. The optical module as claimed in claim 1, wherein each optical member is a facet of a reflector, said facet having an inclination distinct from an inclination of each other facet of said reflector.

9. The optical module as claimed in claim 4, wherein the exit optical member has a smooth, substantially dome-shaped exit face.

10. A luminous system for an automotive vehicle, comprising an optical module as claimed in claim 1.

11. The optical module as claimed in claim 2, wherein the optical members are linked to the same exit optical member to form a primary optical element of the primary optical system, the primary optical element being a one-piece part, and wherein the projecting optical system is arranged to project onto the ground an image of each of the junction faces of the optical members.

12. The optical module as claimed in claim 2, wherein the primary optical system comprises a primary optical element comprising at least one primary light guide linked to the exit optical member, said primary light guide comprising the shared light entrance face, opposite which is placed said light source, and a junction face linking said primary light guide to the exit optical member, the primary optical element being a one-piece part, and wherein said image formed by each optical member is an image of said junction face.

13. The optical module as claimed in claim 5, wherein the exit optical member has a smooth, substantially dome-shaped exit face.

14. A luminous system for an automotive vehicle, comprising an optical module as claimed in claim 2.

15. The optical module as claimed in claim 6, wherein the exit optical member has a smooth, substantially dome-shaped exit face.

16. A luminous system for an automotive vehicle, comprising an optical module as claimed in claim 3.

\* \* \* \* \*